United States Patent [19]

Hutchinson

[11] 3,733,116
[45] May 15, 1973

[54] MIRRORS HAVING STRETCHED REFLECTIVE SHEET MATERIALS

[75] Inventor: Mark Earle Hutchinson, Goffstown, N.H.

[73] Assignee: American Velcro, Inc., Manchester, N.H.

[22] Filed: Apr. 20, 1972

[21] Appl. No.: 245,720

[52] U.S. Cl.................................350/288, 350/310
[51] Int. Cl..................................................G02b 5/08
[58] Field of Search........................350/288, 310

[56] References Cited

UNITED STATES PATENTS 3,552,835 1/1971 Benzies..............................350/288
3,608,179 9/1971 Jeffree...............................350/310
3,687,524 8/1972 Martinez............................350/310

Primary Examiner—Ronald L. Wibert
Assistant Examiner—Michael J. Tokar
Attorney—Dean S. Edmonds et al.

[57] ABSTRACT

A planar mirror having a reflective surface including a metallized thin film reflective sheet material in a stretched condition over a raised ridge on one side of the supporting frame, with means for securing the film in the stretched condition over the frame. A resilient wedge-like member is positioned and gripped between an upper flange member of each frame member and a supporting substrate member such that compressive reaction forces of the resilient members are in balanced equilibrium with compressive and bending forces of the film thus creating a continuous and optically correct reflecting mirror surface.

8 Claims, 5 Drawing Figures

PATENTED MAY 15 1973 3,733,116

MIRRORS HAVING STRETCHED REFLECTIVE SHEET MATERIALS

BACKGROUND OF THE INVENTION

1. Field of the Invention

This invention relates to improvements in mirrors having a reflecting surface provided by a metallized reflective sheet material, such as aluminized polyester, in a stretched condition over a supporting frame.

2. Description of the Prior Art

It has been generally known that lightweight planar mirrors can be produced by stretching over a generally peripheral ridge on a supporting frame, a thin flexible sheet material having a reflective surface. Examples of different constructions of such mirrors are found in various patents. For example, British Pat. No. 841,875 to General Electric Company Limited, London, relates to a reflector having a reflecting polymeric material attached to a base material. Other related patents include U.S. Pat. No. 3,180,220 to Jeffree; U.S. Pat. No. 3,434,181 to Benzies; U.S. Pat. No.3,552,835 to Benzies; and U.S. Pat. No. 3,608,179 to Jeffree et al.

One of the most important features in the construction of these mirrors is to take extraordinary care that the frames be flat and true or else the stretched sheet material will give a distorted image. The portion of the frame over which the reflective sheet material is stretched must be extremely flat, coplanar, and continuous. Even minute irregularities in the upper surface portion of the generally peripheral ridge over which the sheet material is stretched results in magnified distortions in the mirror surface with a loss of optical accuracy. Minor inaccuracies in the frame construction or deflections in the frame due to compressive and bending forces caused by the stretched condition of the film results in great distortions in the mirror surface. For example, deviations up to 0.001 inch in coplanarity of the peripheral ridge around the frame were found to be detrimental to the mirror quality.

For this reason the preferred construction of mirrors of this type includes extruded aluminum, generally inwardly open channel members defining the frame. The channel members surround and hold a lightweight reinforcing substrate member between upper and lower flange members of the channel. The frame is bent into the desired shape with the end portions fastened together, or it is mitered and welded at its corners with great care taken to obtain a true planar frame so that when the reflective film is stretched over the bead, it will be truly flat so that the optical correctness required to produce a distortion-free image is realized. Examples of various patents disclosing different frame constructions but unrelated to the production of lightweight mirrors are: U.S. Pat. Nos.: 1,775,717 to Everhard; 2,219,595 to Long; 2,255,151 to Clements; 2,260,176 to Ford; 2,256,802 to Voege; 3,012,362 to Blindeman; 3,028,638 to Goellner; 3,133,375 to Myren; 3,154,453 to Demke et al.; and 3,494,409 to Prechtl et al.

Once the film is stretched over the bead and placed in tension, it produces severe bending and twisting forces on the frame and it is the function of the reinforcing substrate to alleviate these forces and distribute them uniformly along the frame. The substrate generally used has been a rigid foam plastic substrate which did not provide the requisite reinforcement and did not facilitate production of an optically correct mirror. To resort to a thicker substrate member involved crimping or pinching the substrate to reduce its thickness along the periphery to fit it within the flange members of the channel members. However, even after crimping the substrate, it was found that the foamed plastic was not sufficiently resilient to provide a tight fit in the channel members. This did not provide sufficient stiffening for the frame. To use a thicker substrate member would increase the weight of the mirrors, thus offsetting some of their primary advantages.

I have invented an improvement in the lightweight mirrors of the type described wherein the frame and general mirror is reinforced in such a manner that an equilibrium relationship is provided between the compressive and bending forces of the stretched film and the reinforced frame thereby creating a continuous and optically correct reflecting surface in the mirror due to the resulting dimensional stability in the frame.

SUMMARY OF THE INVENTION

Broadly stated, the invention relates to a planar mirror having a thin-film reflective sheet material in a stretched condition over a supporting frame. The frame includes upper and lower flange members extending inwardly from a peripheral side member toward the central portion of the frame defining an inwardly open channel. Means are provided for securing the sheet material in the stretched condition. A supporting substrate member is positioned and gripped within the flange member to provide reinforcement to the frame. A generally peripheral raised ridge is positioned along the upper side of the frame over which the thin film is stretched in spaced relation to the upper surface of the supporting substrate member. At least one resilient member is positioned between the upper flange member of each channel member and the corresponding marginal edge portions of the supporting substrate member along at least a portion of the length of each channel member. The resilient member is in compression between the upper flange member and the substrate member and provides a reinforcement in the frame in relationship to the compressive and bending forces of the stretched film such that the compressive reaction forces of the compressed resilient members are in a balanced equilibrium with the compressive and bending forces of the film. This equilibrium condition results in the creation of an optically correct reflecting mirror surface due to the resulting dimensional stability in the frame.

The invention is particularly useful in creating high quality lightweight thin film mirrors of large dimensions which previously were not possible due to the difficulty in maintaining stability in the lightweight frames while simultaneously minimizing their weight. The mirrors produced according to the present invention are devoid of the problems encountered in producing accurate mirrors according to the prior art.

BRIEF DESCRIPTION OF THE DRAWINGS

A preferred embodiment of the invention is described herein below with reference to the drawings wherein.

DESCRIPTION OF THE PREFERRED EMBODIMENTS

In the following description the "upper" portion of the mirror or frame refers to the portion including the raised ridge over which a metallized sheet is stretched. The "lower" portion refers to the rear portion of the mirror opposite the reflecting surface.

Figure 1:
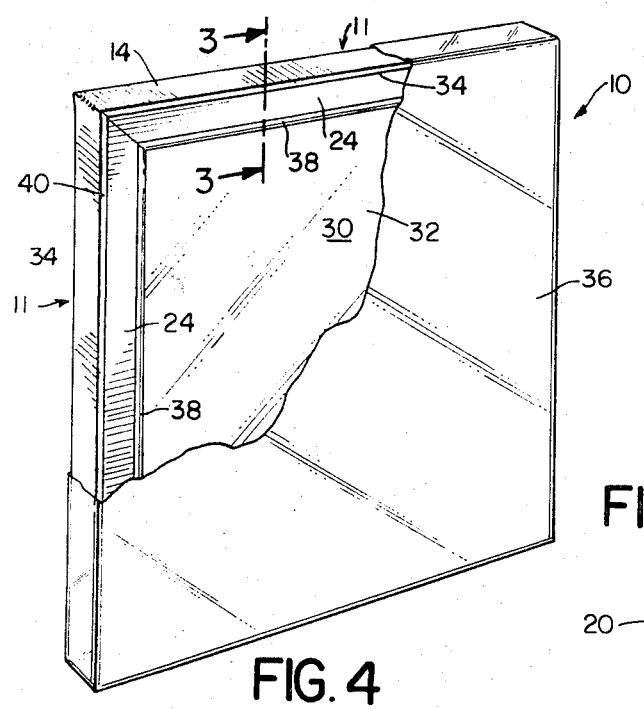
FIG. 1 is a perspective view of a lightweight thin film mirror with a portion cut away to show the mitered and welded construction with supporting substrate and the resilient wedge-like member of the present invention.
Figure 4:
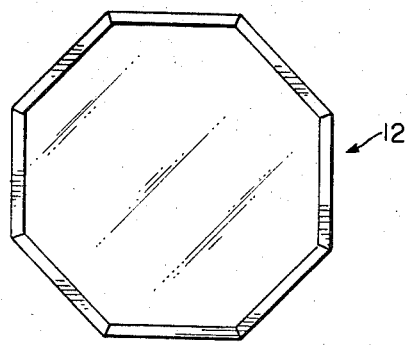
FIG. 4 is a front elevation of a mirror having an octagonal configuration.

Referring to the drawings, there is shown in FIG. 1 a thin film mirror 10 of lightweight construction of the type generally concerned with herein. The frame is preferably polygonal, having any number of sides. For example, the mirror may have a triangular, circular or any other geometric shape. Also see, for example, the rectangular mirror 10 in FIG. 1 and the octagonal mirror 12 in FIG. 4. The members forming the frame are preferably inwardly open channel-like members 11 of extruded aluminum having a side member 16 shown in FIG. 3 which substantially defines the outer periphery or side surface 14 of the frame shown in FIG. 2. The side member 16 has a thickness shown at 18 in FIG. 3 which separates the inner surface 20 from the outer surface 14 of the frame. A lower flange member 22 extends from the lower edge portion of the side member inwardly toward the central portion of the frame. The upper flange member 24 is spaced apart from the lower flange member 22 and extends inwardly from the side member 16 toward the central portion of the frame.

Figure 2:
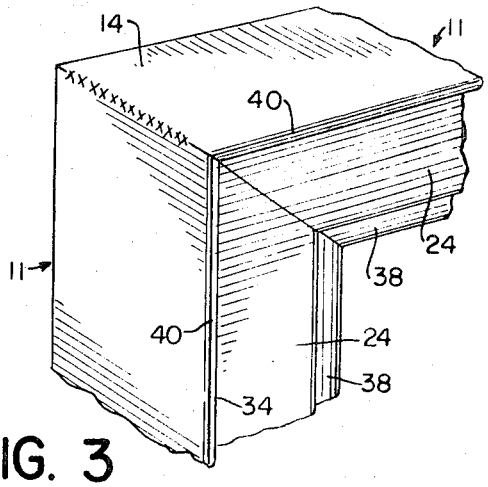
FIG. 2 is a fragmentary view showing the mitered and welded corners of the frame of FIG. 1.

The frame side members may be connected in end-to-end relation in any known manner. A preferred means of connecting the frame members is shown in FIGS. 1 and 2 wherein the end portions are bevelled or mitered as shown. The members are positioned in angular relationship and the end portions are fusion-welded as shown. The melt area preferably extends from the rear portion of the frame to a point slightly below the raised ridge or peripheral bead so that the continuity of the upper surface of the ridge is maintained; also the coplanarity of the ridge is unaffected by the weld or the high temperatures used for welding the frame members in end-to-end relation.

Figure 5:
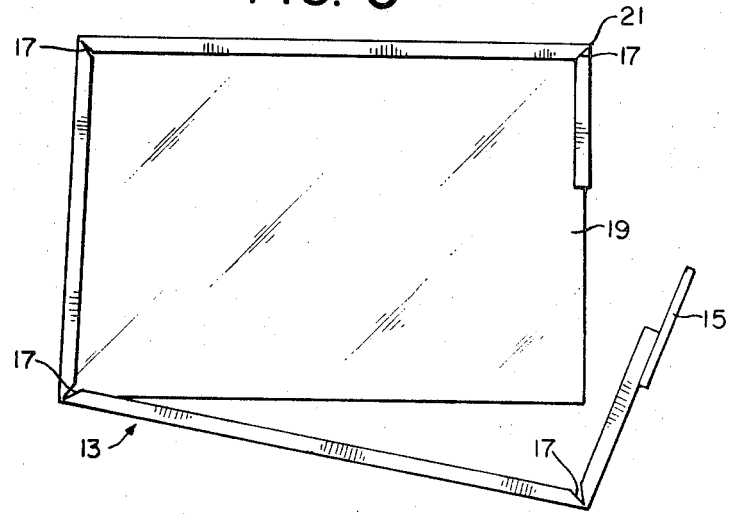
FIG. 5 is a front elevation showing a partially assembled notched and bent frame construction.

An alternate form for the frame is shown in FIG. 5 wherein a unitary channel member 13 has V-shaped notched portions 17 removed from the flange members and the member is bent in at least two locations such as at 21 to form a polygonal frame. The two end portions of the frame are attached by suitable means such as a connecting strap 15 using rivets (not shown) or other attachment devices.

Figure 3:
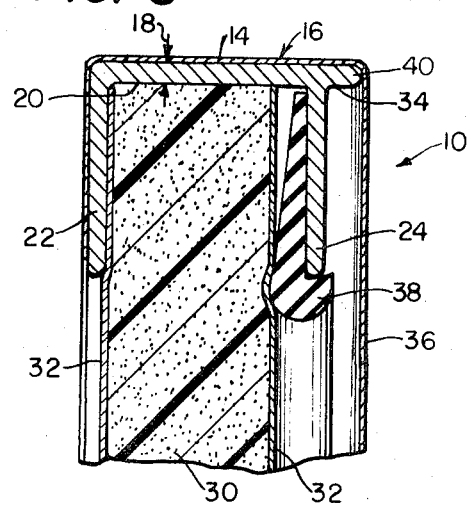
FIG. 3 is a view taken along lines 3—3 of FIG. 1 showing the cross section of the frame member with the substrate support and the wedge-like improvement of the present invention.

In either of the preferred frames a supporting substrate member 30 shown in FIGS. 1 and 3, and 19 shown in FIG. 5, is preferably a polyurethane lightweight foamed plastic material having a sandwich construction using a thin skin 32 of aluminum foil or glass fiber for example. Such substrate materials are similar to the insulation materials generally used in building construction. However, any lightweight reinforcement member may be used. Examples of such other materials include polystyrene, polyvinyl chloride, phenolic, or other plastics.

A raised ridge 34, shown in FIG. 3 is positioned along the upper side of each channel-like member 11 and forms a generally continuous peripheral bead 34 shown in FIG. 3, around the upper surface portion of the frame. For the mitered and welded frames the bevelled portions of the bead 34 of each frame member 11 are also positioned in face-to-face relation so that a coplanar smooth surface is formed at the corners of the frame. A metallized thin sheet material 36 is stretched over the raised ridge 34 across the upper side of the frame. The thin sheet material is preferably a polyimide or a polyester such as polyethylene terephthalate having a vacuum deposited reflective layer of aluminum, silver, chromium and the like. The sheet material forms a smooth and flat reflecting mirror surface over the frame in spaced relationship with the upper surface of the supporting substrate as shown in FIG. 3. The sheet material is secured in the stretched condition by means such as contact cement on the rear peripheral edge portion of the frame. In the notched and bent frames, the corner portions of the raised ridge are formed by bending the unitary channel member including the raised ridge.

The reinforced frame of the present invention provides a superior mirror whether it is used with the mitered and welded frames or the notched and bent frames. The mirror includes at least one resilient member 38 shown in FIG. 3, positioned between each upper flange 24 and the substrate member 30 along at least a marginal portion thereof. It is most important that a resilient member extends at least over the central portion of each frame member since reinforcement is primarily required in those locations which are spaced apart from the stiffer corner portions of the frame. In the preferred form the resilient members form a continuous strip along the inner portions of the flange members by placing them in end-to-end relation around the inner dimensions of the frame corresponding to the peripheral edge portions of the substrate member. This form provides a continuous strip around the inner periphery of the frame. In another preferred form the resilient wedge-like members are also mitered or bevelled and placed in end-to-end continuous relation around the inner portions of the frame to provide the best continuity in the resilient strip. The wedge-like members 38 are preferably substantially triangular in cross section as shown.

The resilient members 38 are in compression between the upper flange member 24 and the substrate member 30 such that a reinforcement is provided in the frame in relationship to the compressive and bending forces of the stretched film 36 shown in FIG. 3. The compressive reaction forces of the compressed resilient members 38 are in balanced equilibrium with the compressive and bending forces of the film, thereby creating a continuous and optically correct reflecting mirror surface.

It should be noted that the thickness of the substrate member 30 may be varied according to the thickness of the wedge-like member 38 so as to optimize the combination of components in the best possible manner depending upon the size of the mirror.

I claim:

1. A planar mirror having a reflective surface formed by a metallized thin-film reflective sheet material in a stretched condition over a supporting frame comprising a frame including upper and lower flange members extending inwardly from a peripheral side member toward the central portion of the frame defining an inwardly open channel, means for securing said sheet material in said stretched condition over said frame, a supporting substrate member positioned and gripped within said flange members to provide reinforcement to said frame, a raised ridge positioned along the upper side of said frame over which the metallized thin film is stretched in spaced relation to the upper surface of said substrate member, and at least one resilient member positioned between the upper flange member of each channel member and the marginal edge portions of the supporting substrate member along at least a portion of the length of each channel member, said resilient members being in compression therebetween to provide a reinforcement in said frame in relationship to the compressive and bending forces of said stretched film such that the compressive reaction forces of the compressed resilient members are in balanced equilibrium with said compressive and bending forces of the film, thereby creating a continuous and optically correct reflecting mirror surface.

2. The mirror according to claim 1 wherein said supporting substrate member comprises a foamed plastic material and said frame comprises aluminum inwardly open channel members having mitered end portions positioned in adjacent end-to-end relation defining an angle therebetween, said end portions held in end-to-end relation by a fusion-welded portion at the interface between said mitered end portions of said channel members.

3. The mirror according to claim 2 wherein said resilient members comprise wedge-like strips positioned in end-to-end relation between the upper flange member of each channel member and the substrate member such that the strips provide a continuous reinforcement along the inner periphery of the channel members between the upper flange members and the peripheral edge portions of the supporting substrate member.

4. The mirror according to claim 3 wherein the resilient wedge-like strips have mitered end portions such that they are positioned in end-to-end angular relationship corresponding to the angles formed by the corresponding channel members of said frame.

5. The mirror according to claim 1 wherein said supporting substrate comprises a foamed plastic material and said frame comprises a bent unitary aluminum channel member having two end portions secured by attachment means, said channel member having notched portions removed from the upper and lower flange members at each bend defining an angular relationship between adjacent bent portions of the channel member, said unitary channel member defining a polygonal configuration of said frame.

6. The mirror according to claim 5 wherein said resilient members comprise wedge-like strips positioned in end-to-end relation between the upper flange member of each channel member and the substrate member such that the strips provide a continuous reinforcement along the inner periphery of the channel members between the upper flange members and the peripheral edge portions of the supporting substrate member.

7. The mirror according to claim 6 wherein the resilient wedge-like strips have mitered end portions such that they are positioned in end-to-end angular relationship corresponding to the angles formed by the corresponding channel members of said frame.

8. In a planar mirror having a reflective surface formed by a metallized polyester reflective sheet material supported over a peripheral ridge on a substantially rigid backing member, the combination comprising:
a backing member having a frame defined by a metal member, each member having an inwardly opened channel-like cross section of the type including:
1. a side member defining the periphery of the frame;
2. a lower flange member extending from the rear portion of each side member toward the central portion of the frame; and
3. an upper flange member spaced apart from said lower flange member and extending from said side member toward the central portion of said frame;
b. adjacent side members having mitered end portions positioned in face-to-face relation to form a joinder of said frame members, said joinder being fusion-welded to secure the members in angular relation with respect to each other;
c. a foamed plastic supporting substrate member configured to substantially conform to the configuration of said frame and positioned with said frame between the upper and lower flange members of said channel-like side members;
d. a raised ridge positioned along the upper side of said frame immediately above the upper flange member and having an upper surface portion, the end portions of each ridge being bevelled similarly to its associated frame member such that adjacent ridges are positioned in face-to-face relation defining an angle therebetween substantially corresponding to the angle between said frame members, said ridges further defining a continuous and coplanar upper surface portion along the upper side of said frame over which said metallized reflecting sheet is held in a stretched condition; and
e. a resilient member having a triangular cross section positioned between the upper flange member of each channel-like member and the marginal edge portions of the supporting substrate member along the lengths of the channel members, said resilient members being in compression therebetween to provide a reinforcement in said frame in relationship to the compressive and bending forces of said stretched film such that the compressive reaction forces of the compressed resilient members are in balanced equilibrium with said compressive and bending forces of the film creating a continuous and optically correct reflecting mirror surface.

* * * * *